(12) United States Patent
Lakirovich et al.

(10) Patent No.: US 8,452,490 B2
(45) Date of Patent: May 28, 2013

(54) ELECTRONIC CIRCUIT FOR CHARGING AND HEATING A BATTERY

(75) Inventors: Konstantin Lakirovich, Chicago, IL (US); Brett Walach, Montgomery, IL (US)

(73) Assignee: Control Solutions LLC, Aurora, IL (US)

( * ) Notice: Subject to any disclaimer, the term of this patent is extended or adjusted under 35 U.S.C. 154(b) by 523 days.

(21) Appl. No.: 12/637,471

(22) Filed: Dec. 14, 2009

(65) Prior Publication Data

US 2011/0144861 A1    Jun. 16, 2011

(51) Int. Cl.
*H02J 7/00* (2006.01)
*G06F 7/00* (2006.01)
*G06F 1/26* (2006.01)

(52) U.S. Cl.
USPC ............... 701/36; 700/286; 320/103; 320/108

(58) Field of Classification Search
USPC ................. 701/36; 700/286; 320/103, 108
See application file for complete search history.

(56) References Cited

U.S. PATENT DOCUMENTS

| | | | |
|---|---|---|---|
| 4,222,000 A | 9/1980 | Silvertown et al. | |
| 4,292,578 A | 9/1981 | Steigerwald et al. | |
| 4,468,605 A | 8/1984 | Fitzgerald et al. | |
| 5,281,792 A * | 1/1994 | Lee et al. | 219/209 |
| 5,362,942 A * | 11/1994 | Vanderslice et al. | 219/209 |
| 5,396,163 A * | 3/1995 | Nor et al. | 320/159 |
| 5,563,494 A | 10/1996 | Cuesta et al. | |
| 5,668,461 A * | 9/1997 | Hancock et al. | 320/103 |
| 5,710,507 A * | 1/1998 | Rosenbluth et al. | 307/66 |
| 5,736,834 A | 4/1998 | Kuno | |
| 5,757,595 A | 5/1998 | Ozawa et al. | |
| 5,831,514 A * | 11/1998 | Hilpert et al. | 340/309.8 |
| 5,990,661 A * | 11/1999 | Ashtiani et al. | 320/128 |
| 6,002,240 A | 12/1999 | McMahan et al. | |
| 6,072,301 A * | 6/2000 | Ashtiani et al. | 320/128 |
| 6,163,135 A | 12/2000 | Nakayama et al. | |
| 6,209,672 B1 * | 4/2001 | Severinsky | 180/65.23 |
| 6,259,229 B1 * | 7/2001 | Ashtiani et al. | 320/128 |
| 6,271,648 B1 | 8/2001 | Miller | |
| 6,326,767 B1 * | 12/2001 | Small et al. | 320/116 |
| 6,338,391 B1 * | 1/2002 | Severinsky et al. | 180/65.23 |
| 6,404,163 B1 * | 6/2002 | Kapsokavathis et al. | 320/104 |
| 6,661,203 B2 | 12/2003 | Wolin et al. | |
| 6,882,061 B1 * | 4/2005 | Ashtiani et al. | 307/10.7 |
| 7,105,936 B2 | 9/2006 | Kubo | |
| 7,240,653 B2 * | 7/2007 | Marchand et al. | 123/179.19 |
| 7,402,982 B2 | 7/2008 | Ito et al. | |
| 7,417,407 B1 * | 8/2008 | Stuart et al. | 320/166 |
| 8,040,110 B2 * | 10/2011 | Al-Anbuky et al. | 320/150 |
| 2002/0070709 A1 * | 6/2002 | Small et al. | 320/150 |
| 2005/0196662 A1 * | 9/2005 | Prema et al. | 429/50 |
| 2006/0028167 A1 * | 2/2006 | Czubay et al. | 320/104 |
| 2007/0292724 A1 * | 12/2007 | Gilchrist | 429/9 |
| 2008/0036419 A1 * | 2/2008 | Cook et al. | 320/104 |
| 2008/0231226 A1 | 9/2008 | Hoffman et al. | |
| 2010/0207771 A1 * | 8/2010 | Trigiani | 340/636.1 |
| 2011/0068749 A1 * | 3/2011 | Maleus | 320/162 |
| 2011/0144861 A1 * | 6/2011 | Lakirovich et al. | 701/36 |
| 2011/0288704 A1 * | 11/2011 | Schwarz et al. | 701/22 |
| 2012/0001594 A1 * | 1/2012 | Berkowitz et al. | 320/118 |

* cited by examiner

*Primary Examiner* — Thomas Black
*Assistant Examiner* — Wae Louie
(74) *Attorney, Agent, or Firm* — McCracken & Frank LLC

(57) ABSTRACT

An electronic circuit configured to operate in any of a plurality of charging and heating modes for two batteries, a primary battery and a secondary battery. The electronic circuit includes a plurality of switch and diode pairs in a stacked configuration. The stacks of switch and diode pairs are connected to an inductor, to a plurality of mode control switches, and the two batteries. The mode control switches are used to set the modes, which include a charging mode, a self-heating, a power exchange-heating mode, and a direct power transfer mode.

16 Claims, 10 Drawing Sheets

ELECTRONIC CIRCUIT FOR CHARGING AND HEATING A BATTERY

FIELD OF THE INVENTION

This invention relates to electronic circuits, and more particularly to an electronic circuit for charging and heating a battery.

BACKGROUND

Battery-operated systems may operate as battery-operated sub-systems operating within larger battery-operated systems. One example includes an automobile. An automobile relies on a battery for its electrical power. The automobile may include electronic systems that also rely on their own battery for electrical power. Such electronic systems may be built into the automobile, or optionally added after the automobile has been assembled. The battery may be added to power the battery-powered sub-system to avoid overloading the main system battery, or to be able to provide the sub-system as optional equipment that is added later.

Certain military vehicles use doors that have layers of armor built in to withstand enemy fire and other combat environment hazards. The armor adds a substantial amount of weight to the door often making them difficult for a user to open or close the vehicle doors. Powered door systems may be added to such doors to provide a powered mechanism to assist in opening or closing the doors. Such powered mechanisms may include an electric motor (such as a DC motor), a hydraulic drive, or a pneumatic drive.

The powered door systems may be controlled by an electronic controller. The electronic controller and the powered mechanism may use the military vehicle's battery as a source of power. However, this may overload the vehicle battery. A secondary battery may be added to power powered door system. In battery powered systems, such as a military vehicle, that include a battery-powered sub-system, such as the powered door system, the primary battery may be connected to the secondary battery to enable charging the secondary battery.

The connection between the batteries may need to be controlled, and the secondary batteries may need to be sufficiently recharged. A controller may be used to switch the batteries into different modes for charging and for providing power.

In some applications, such as in military vehicles, the batteries may be subjected to extreme conditions that may affect the battery performance. For example, military vehicles may operate in extreme cold. Some batteries perform better than others at low temperatures. For example, low energy density lead-acid batteries perform better at low temperatures than higher energy density batteries. However, because lead-acid batteries have a low and relatively fixed energy density, their size is directly related to their capacity. As a result, the size of lead-acid batteries increases as their capacity increases. For certain applications, the size of lead-acid batteries can become prohibitively large.

High energy density batteries are alternatives to lead-acid batteries. Because of the high energy density in these batteries, similar capacities can be achieved in smaller sizes. Such high energy density batteries include: nickel metal hydride (NiMH) batteries; nickel-cadmium (NiCd) batteries; and lithium-ion (L-ion) batteries. However, these high energy density batteries do not perform well at low temperatures, and experience performance degradation much faster than their lead-acid counterparts. As a result of these space and temperature requirements, it is desirable to have a high energy density battery that can maintain a reasonable power output at low temperatures. One solution is to heat the high-density batteries.

There are several known methods of heating the battery. The battery may be heated by external power dissipated in an external enclosure—heating blanket. This method requires a source of external energy, which may not be available. In addition this method is not energy efficient, because some of the energy is dissipated into the environment. The battery may be heated by charging, which also requires an external energy source. The battery may also be heated by alternative current, which may circulate almost lossless between the battery and an energy tank—inductor, or between two batteries via energy mediator—also inductor. These two methods require much less energy to warm the battery, because the actual warming is happening inside the battery by chemical reaction during charging and discharging. The necessity of self-heating mode may arrive, when no other source of energy besides the battery itself is available. Those skilled in the art will know that a self-warmed battery performs much better than a cold battery, even if the battery has wasted part of its charge on warming.

Accordingly, there is a need for a way to efficiently charge and heat a battery in battery-operated systems that include battery-operated sub-systems.

SUMMARY

In view of the above, an electronic circuit is provided. The electronic circuit is coupled between two batteries. A plurality of mode control switches are configured to set the electronic circuit to operate in one of a plurality of charging and heating modes. The electronic circuit includes a plurality of switch and diode pairs, each switch and diode pair including a diode connected across an output of an electronic switch. The electronic switch has a trigger connected to a control signal. An inductor is connected to the plurality of switch and diode pairs. The electronic circuit is configured to operate in the plurality of charging and heating modes according to the states of the mode control switches and the control signals applied to the switch and diode pairs. The switch and diode pairs are triggered on and off to either charge the inductor or operate the inductor as a current source for charging and heating the batteries in accordance with the charging and heating modes.

Those skilled in the art will appreciate that the features mentioned above and those yet to be explained below can be used not only in the respective combinations indicated, but also in other combinations or in isolation, without leaving the scope of the present invention.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION

I. Multi-Mode Converter Circuit

Figure 1:
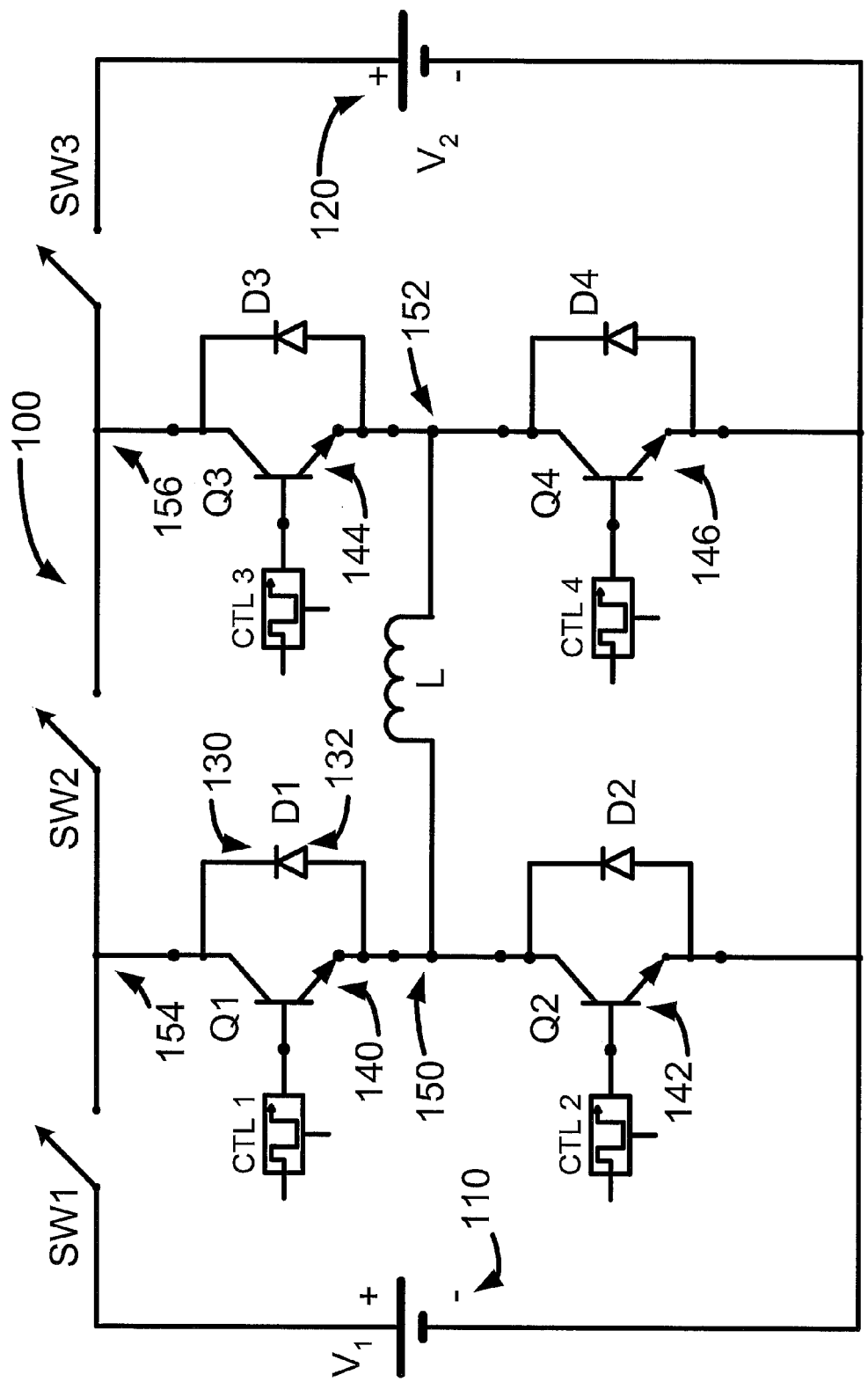
FIG. 1 is a schematic diagram of an electronic circuit for charging and heating primary and secondary batteries.

FIG. 1 is a schematic diagram of an electronic circuit 100 for charging and heating a primary battery 110 and a secondary battery 120. The electronic circuit 100 may be switched to operate in different modes configured to perform the various configured charging and self-heating functions. The electronic circuit 100 in FIG. 1 includes three mode control switches SW1, SW2, SW3, four transistor switches Q1, Q2, Q3, and Q4, an inductor L, and four diodes D1, D2, D3, and D4. The four diodes D1, D2, D3, and D4 are connected across the outputs of corresponding transistors Q1, Q2, Q3, and Q4. The diodes D1, D2, D3, and D4 are connected so as to provide a current path in the direction opposite of the transistors'. For example, the cathode 130 of diode D1 is connected to the collector of transistor Q1, and the anode 132 of diode D1 is connected to the emitter of transistor Q1. When the transistor Q1 is switched 'ON,' current flows through the transistor. When the transistor Q1 is switched 'OFF,' a current path is provided through diode D1 if the voltage across the transistor Q1 is reversed. As shown in FIG. 1, the transistors Q1, Q2, Q3, and Q4, and diodes D1, D2, D3, and D4 are connected to form four switch and diode pairs. The first transistor Q1 is connected to diode D1 to form a first switch and diode pair 140. The second transistor Q2 is connected to diode D2 to form a second switch and diode pair 142. The third transistor Q3 is connected to diode D3 to form a third switch and diode pair 144. The fourth transistor Q4 is connected to diode D4 to form a fourth switch and diode pair 146.

The electronic circuit 100 is configured with the first switch and diode pair 140 and the second switch and diode pair 142 stacked vertically. In this stacked configuration, the emitter of the first transistor Q1 is connected to the collector of the second transistor Q2. The third switch and diode pair 144 and the fourth switch and diode pair 146 are similarly stacked. The inductor L is connected to a first node 150 between the emitter of transistor Q1 and the collector of transistor Q2, and to a second node 152 between the emitter of transistor Q3 and the collector of transistor Q4.

The collector of the transistor (Q1) in the top switch and diode pair 140 of the first stacked switch and diode pairs 140, 142 connects to a third node 154, which is connected to one terminal of the first switch SW1 and one terminal of the second switch SW2. The other terminal of the first switch SW1 is connected to the positive terminal of the primary battery 110. The collector of the transistor (Q3) in the top switch and diode pair 144 of the second stacked switch and diode pairs 144, 146 connects to a fourth node 156, which is connected to the other terminal of the second switch SW2 and one terminal of the third switch SW3. The other terminal of the third switch SW3 is connected to the positive terminal of the secondary battery 120. The emitters of the transistors (Q2 and Q4) of the bottom switch and diode pairs 142, 146 are connected to the negative terminals of both the primary and secondary batteries 110, 120.

The state of the mode control switches SW1, SW2, SW3 determines in which mode, or which functions, the system is performing. If all three mode control switches SW1, SW2, SW3 are switched 'ON,' the primary battery 110 is connected to the secondary battery 120, which implements a direct power transfer mode as discussed in more detail below. By selectively closing the mode control switches SW1, SW2, SW3, different modes performing different functions are performed. Examples of four modes and the states of the mode control switches SW1, SW2, SW3 for each mode are listed below in Table 1.

TABLE 1

| Mode | SW1 | SW2 | SW3 |
| --- | --- | --- | --- |
| Charging mode | Closed | Open | Closed |
| Self-heating mode | Open | Closed | Closed |
| Power Exchange-Heating Mode | Closed | Open | Closed |
| Direct power transfer | Closed | Closed | Closed |
| Batteries in Operation | Open | Don't Care | Open |

In addition to the state of the mode control switches SW1, SW2, SW3, the states of the transistors Q1, Q2, Q3, Q4 in the switch and diode pairs 140, 142, 144, 146 are also switched to control operation of the modes. The modes listed in Table 1 may operate in cycles, which are dependent on the states of the transistors Q1, Q2, Q3, Q4. The cycles allow the electronic circuit 100 to switch from one function to another as described below with reference to FIGS. 2-10. The transition from one cycle to another may be performed by applying a control signal to each of the transistors Q1, Q2, Q3, Q4 in the switch and diode pairs 140, 142, 144, 146. As shown in FIG. 1, a first control signal CTL1 is applied to the base of transistor Q1 in the first switch and diode pair 140 to control the state of the first switch and diode pair 140. A second control signal CTL2 is applied to the base of transistor Q2 in the second switch and diode pair 142 to control the state of the second switch and diode pair 142. A third control signal CTL3 is applied to the base of transistor Q3 in the third switch and diode pair 144 to control the state of the third switch and diode pair 144. A fourth control signal CTL4 is applied to the base of transistor Q4 in the fourth switch and diode pair 146 to control the state of the fourth switch and diode pair 146.

The control signals CTL1, CTL2, CTL3, and CTL4 may be applied by any suitable controller. The controller may be processor controlled or generated from a pre-programmed hardwired signal generator configured to generate control signals in an appropriate pattern. The control signals CTL1, CTL2, CTL3, and CTL4 may be configured by adjusting the duty cycle and frequency of each signal to switch the corresponding transistors according to the function performed in the specific modes of operation.

The inductor L may be any suitable inductor. As described in more detail below with reference to FIGS. 2-9, the inductor L provides charge to either the primary or secondary battery for purposes of either charging or heating the batteries in accordance with the operation of the modes. The inductor L receives the charge from one of the batteries when either transistor pair Q1 and Q4, or transistor pair Q2 and Q3 is switched to the 'ON' state. The inductor L provides stored charge to either battery via either diodes D1 and D4 or diodes D2 and D3 when the corresponding transistor pair Q1 and Q4 or transistor pair Q2 and Q3 is turned 'OFF.' The inductance value of the inductor L and the type of inductor selected depends upon the amount of charge it will be required to store, power losses in the inductor L, and any physical size limitations. As an example, for a secondary 24V NiMH battery with current capacity of 3.3 AH, the inductance value of inductor L may vary from 100 µH to several mH.

It is to be understood by those of ordinary skill in the art that the transistors Q1, Q2, Q3, Q4 may be any suitable electronic switch; the 'transistor' being referenced herein solely as an example. The transistors Q1, Q2, Q3, Q4 may be any suitable power transistor. A bipolar transistor (BJT) is referenced here as an example having a collector, emitter and base. The transistors Q1, Q2, Q3, Q4 may also include field effect transistors (FET), which have a gate, a drain and a source. The transistors Q1, Q2, Q3, Q4 may be discrete transistors, or provided in integrated circuit packages. The transistors Q1, Q2, Q3, Q4 may be provided on an integrated circuit with the diodes D1, D2, D3, D4. Other electronic switches may also be used in place of the transistors Q1, Q2, Q3, Q4, including any suitable electronic switch that may be connected as shown with a fly-back diode and is capable of switching sufficiently fast as well as able to handle the current delivered by the primary battery 110 and secondary battery 120.

The diodes D1, D2, D3, D4 may be any suitable diode. As described with reference to the transistors Q1, Q2, Q3, Q4, the diodes should be able to conduct the current delivered by the primary battery 110 and the secondary battery 120.

The mode control switches SW1, SW2, SW3 may be implemented with any suitable switch. The mode control switches SW1, SW2, SW3 may be mechanical switches mounted in a user-accessible area to allow the user to set the mode in which the electronic circuit 100 is to function. The mode control switches SW1, SW2, SW3 may also be electronic switches controlled by a processor-controlled controller to switch between modes automatically to adjust to field conditions.

It is noted that the terms "primary battery," "secondary battery," "system battery," and "sub-system battery" are used herein to provide examples for illustration purposes without limiting the invention to any particular application. The example electronic circuit 100 in FIG. 1 is symmetrical allowing the functions described herein to operate in either direction. For example, the charging mode described below allows the primary battery 110 (the battery on the left) to charge the secondary battery 120 (the battery on the right). However, the charging mode may be implemented in the opposite direction so that the secondary battery 120 charges the primary battery 110 by setting the mode control switches SW1, SW2, SW3 to the appropriate states and coupling the control signals to cycle the switch and diode pairs 140, 142, 144, 146 correctly.

Each operating mode listed in Table 1 is described in further detail below.

II. Charging Mode

Figure 2:
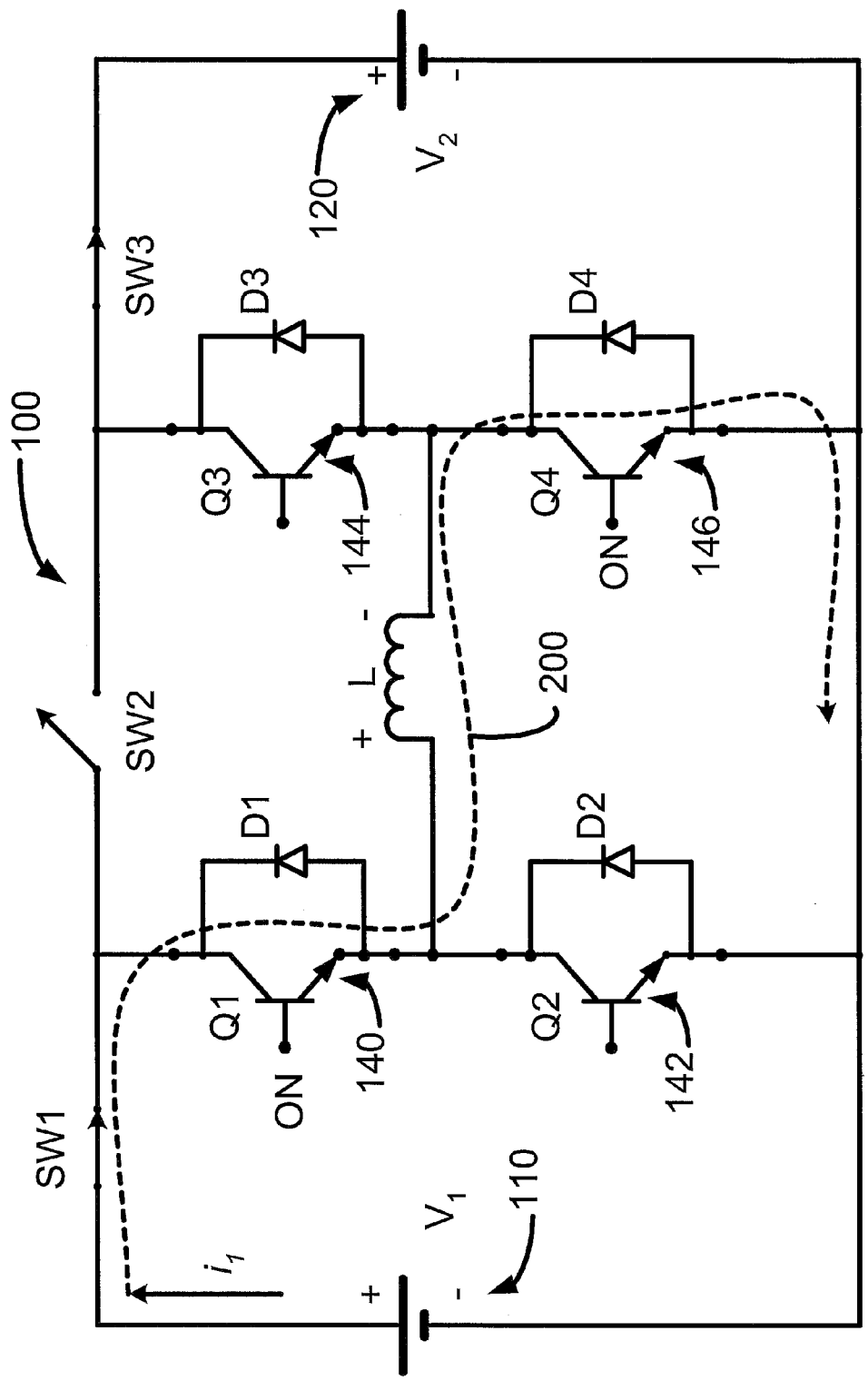
FIG. 2 is a schematic diagram of the electronic circuit in FIG. 1 configured to operate in a first cycle of a charging mode.
Figure 3:
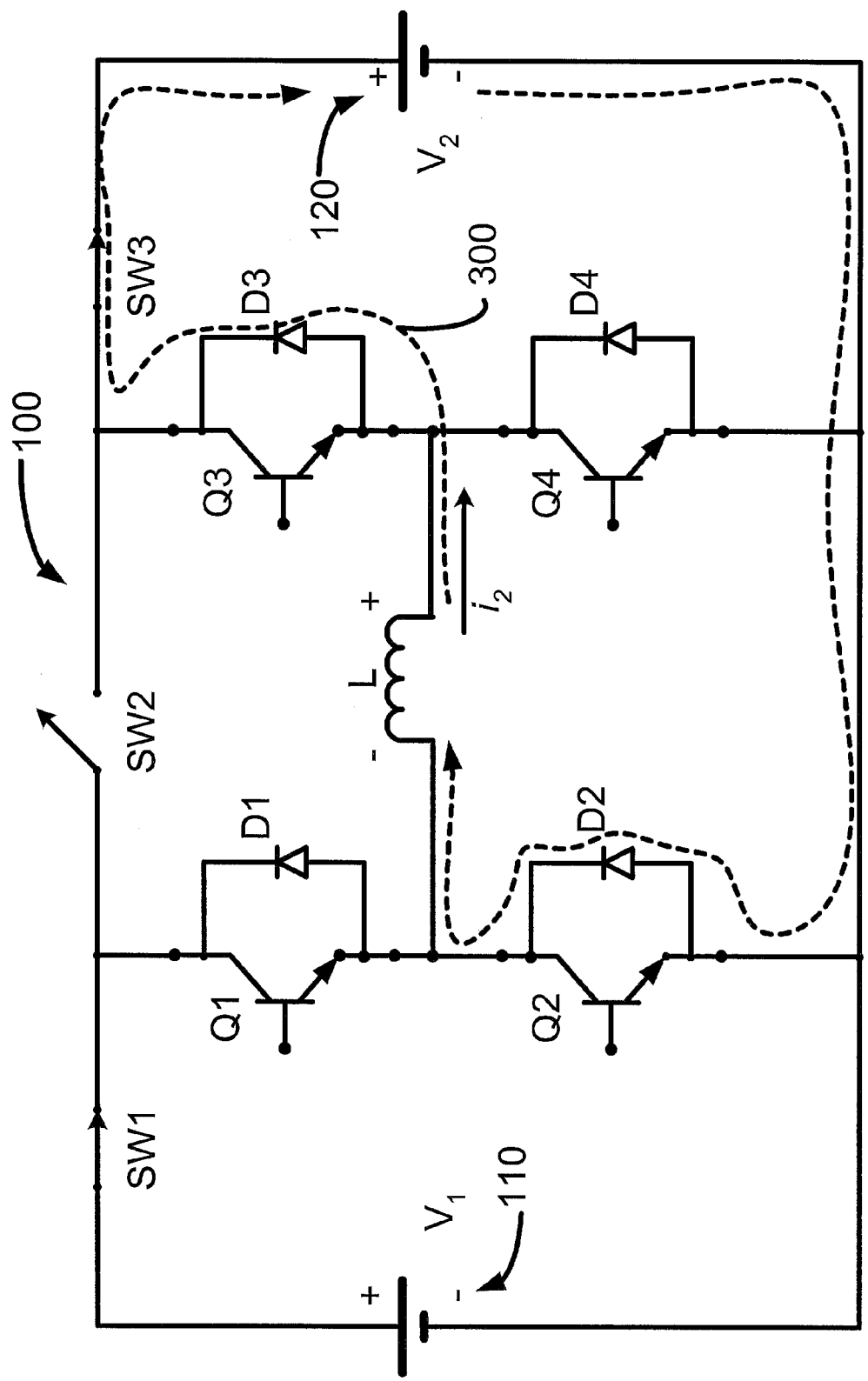
FIG. 3 is a schematic diagram of the electronic circuit in FIG. 1 configured to operate in a second cycle of a charging mode.

The charging mode configures the electronic circuit 100 to charge the secondary battery 120 using charge from the primary battery 110 via the inductor L. The charging mode may be set, either by a user or by an automated process, when mode control switches SW1 and SW3 are closed and mode control switch SW2 is open. The charging mode operates in two cycles. The cycles are controlled by switching the states of the first transistor Q1 and the fourth transistor Q4. FIG. 2 is a schematic diagram of the electronic circuit 100 configured to operate in a first cycle of a charging mode. FIG. 3 is a schematic diagram of the electronic circuit 100 configured to operate in a second cycle of a charging mode.

Referring to FIG. 2, the first cycle is performed by switching the transistors Q1 and Q4 to the ON state. The transistors Q1 and Q4 provide a first cycle current path 200 for the current $i_1$ generated by the primary battery 110. The first cycle current path 200 allows the current $i_1$ to flow through the transistor Q1, through the inductor L and through the transistor Q4 to return to the primary battery 110. During the first cycle, the inductor L is provided with charge from the primary battery 110. The inductor L has an inductance and construction that allows the inductor L to hold sufficient charge, and a sufficient rate of energy transfer to effectively charge the secondary battery 120 over an acceptable period of time. The first cycle is maintained according to the frequency and duty cycle of the signal at transistors Q1 and Q4, which are determined to be sufficiently long to allow the inductor L to become sufficiently charged.

The second cycle is entered by turning off the transistors Q1 and Q4 as shown in FIG. 3. Turning off transistors Q1 and Q4 allows the inductor L to become a current source that generates a current $i_2$ flowing through a second cycle current path 300. The current $i_2$ flows through diode D3 (since transistor Q3 is off), through mode control switch SW3, to the secondary battery 120. The return path to the inductor L flows through diode D2 back to the inductor L. When the inductor L has become suitably discharged, the transistors Q1 and Q4 may be switched back to the 'ON' state to permit re-charging of the inductor L.

The charging mode continues by cycling between the first cycle shown in FIG. 2 and the second cycle as shown in FIG. 3. The switching between the first and second cycles may be controlled by a processor (not shown) via control signals CTL1 and CTL3 (in FIG. 1) until the secondary battery 120 is suitably charged.

III. Self-Heating Mode

Figure 4:
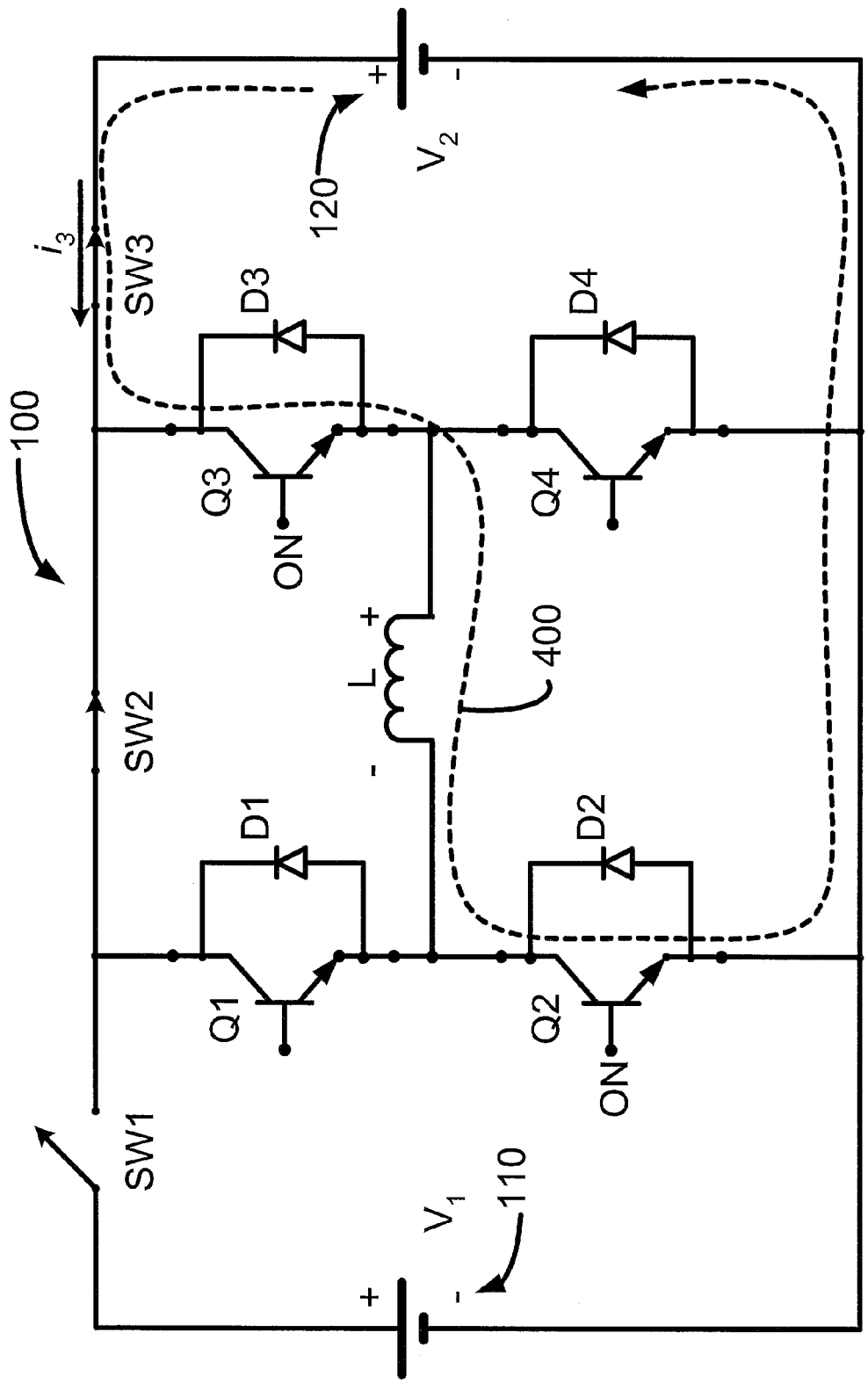
FIG. 4 is a schematic diagram of the electronic circuit in FIG. 1 configured to operate in a first cycle of a self-heating mode.
Figure 5:
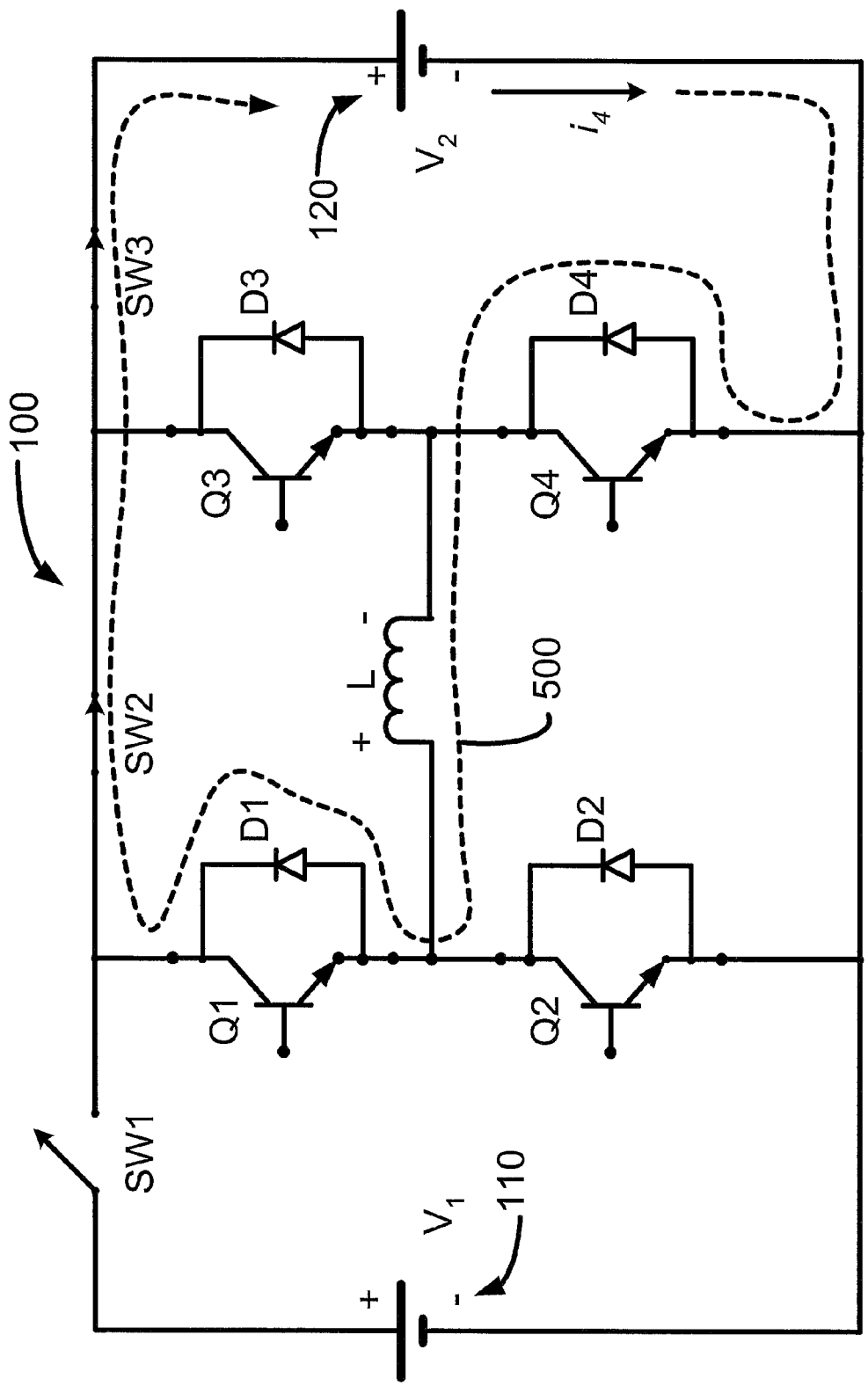
FIG. 5 is a schematic diagram of the electronic circuit in FIG. 1 configured to operate in a second cycle of a self-heating mode.

Batteries may be heated by alternative current flow between the inductor L and secondary battery 120, the secondary battery is charged and discharged, thereby warming the internal structure of the battery and lowering the impedance. Due this action, the battery maintains a sufficiently high temperature level to perform in an otherwise unsuitably low temperature environment. The electronic circuit 100 may provide heating functions in one of two modes. The first of the two heating modes, shown in FIGS. 4 and 5, operates by allowing the secondary battery 120 to enter into a self-heating mode. The secondary battery 120 self-heating mode may be selected by a user, or by an automated process, by setting mode control switches SW2 and SW3 to the closed position, and leaving mode control switch SW1 in the open position. The self-heating mode operates in two cycles as shown in FIGS. 4 and 5. FIG. 4 is a schematic of the electronic circuit 100 configured to operate in a first cycle of a self-heating mode. FIG. 5 is a schematic diagram of the electronic circuit in FIG. 1 configured to operate in a second cycle of a self-heating mode.

Referring to FIG. 4, the transistors Q2 and Q3 are turned "ON" to perform the first cycle of the self-heating mode. In the self-heating mode, the secondary battery 120 generates a current $i_3$, which flows through a first cycle current path 400. The first cycle current path 400 allows the current $i_3$ to flow through the transistor Q3 (which is ON), through the inductor L, and to return to the secondary battery 120 through transistor Q2. During the first cycle, the inductor L is provided with charge from the secondary battery 120. The first cycle is maintained according to the frequency and duty cycle of the signal at transistors Q2 and Q3, which are determined to be sufficiently long to allow the inductor L to become sufficiently charged for purposes of self-heating.

The second cycle is entered by turning off the transistors Q2 and Q3 as shown in FIG. 5. Turning off transistors Q2 and Q3 allows the inductor L to become a current source that generates a current $i_4$ flowing through a second cycle current path 500. The current $i_4$ flows through diode D1, through mode control switches SW2 and SW3, to the secondary battery 120. The return path to the inductor L flows through diode D4 back to the inductor L. When the inductor L has become suitably discharged according to the self-heating function, the transistors Q2 and Q3 may be switched back to the 'ON' state to permit re-charging of the inductor L.

The self-heating mode continues by cycling between the first cycle shown in FIG. 4 and the second cycle as shown in FIG. 5. The switching between the first and second cycles may be controlled by a processor (not shown) via control signals CTL1 and CTL3 (in FIG. 1) until the heating of the secondary battery 120 is no longer needed or desired, which may be indicated by the settings of the mode control switches SW1, SW2, SW3.

IV. Power Exchange-Heating Mode

Figure 6:
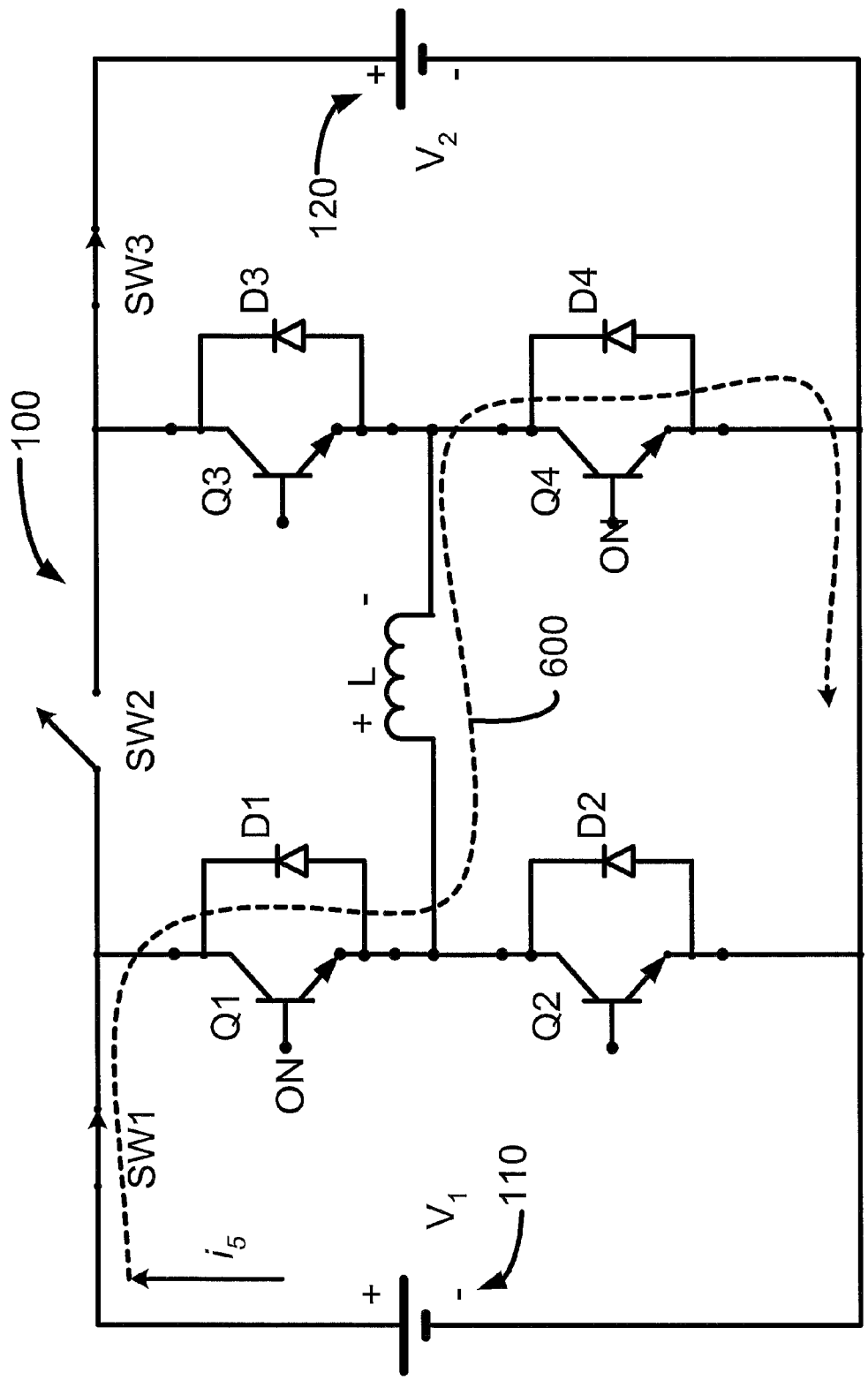
FIG. 6 is a schematic diagram of the electronic circuit in FIG. 1 configured to operate in a first cycle of a power exchange-heating mode.
Figure 7:
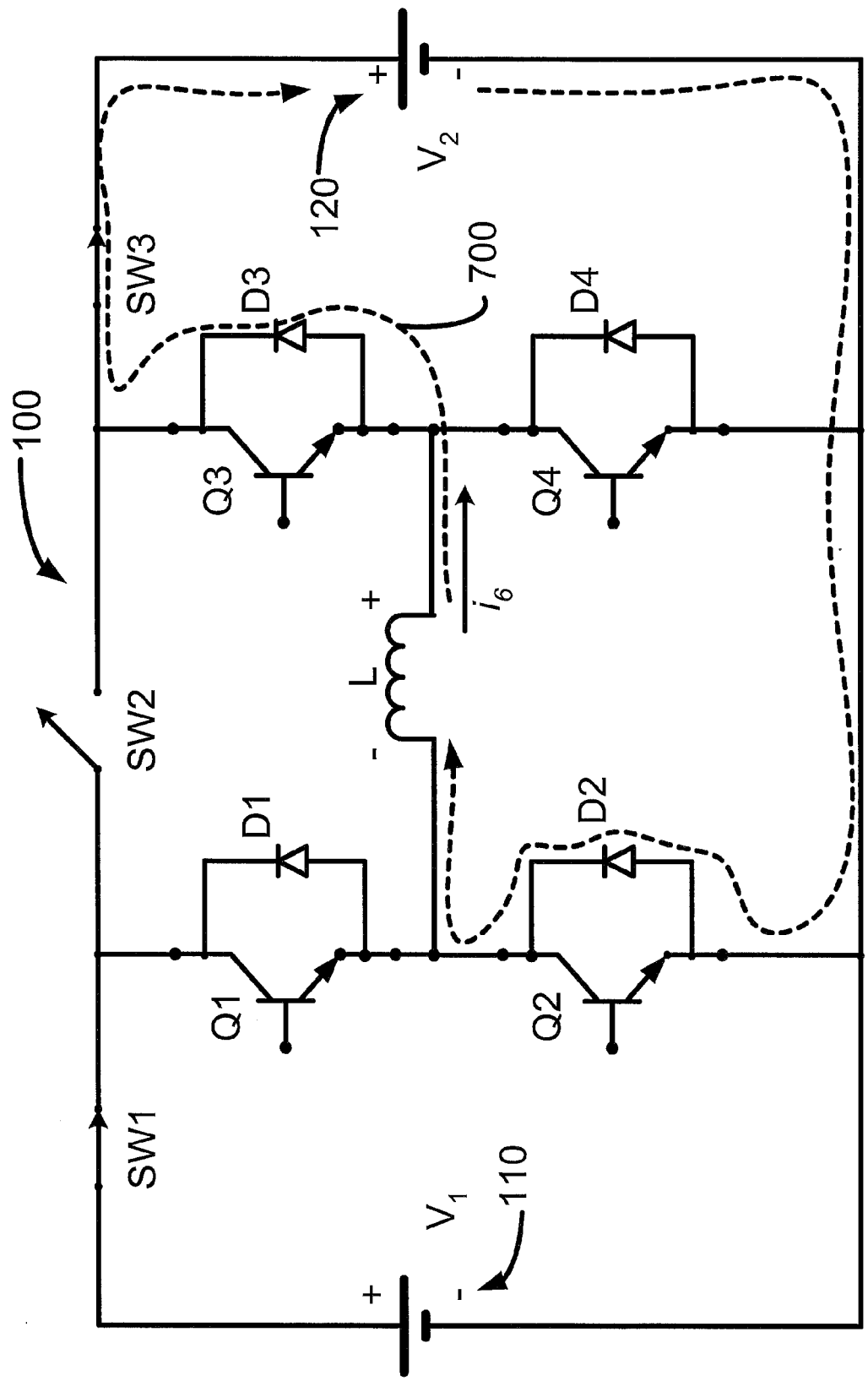
FIG. 7 is a schematic diagram of the electronic circuit in FIG. 1 configured to operate in a second cycle of a power exchange-heating mode.
Figure 8:
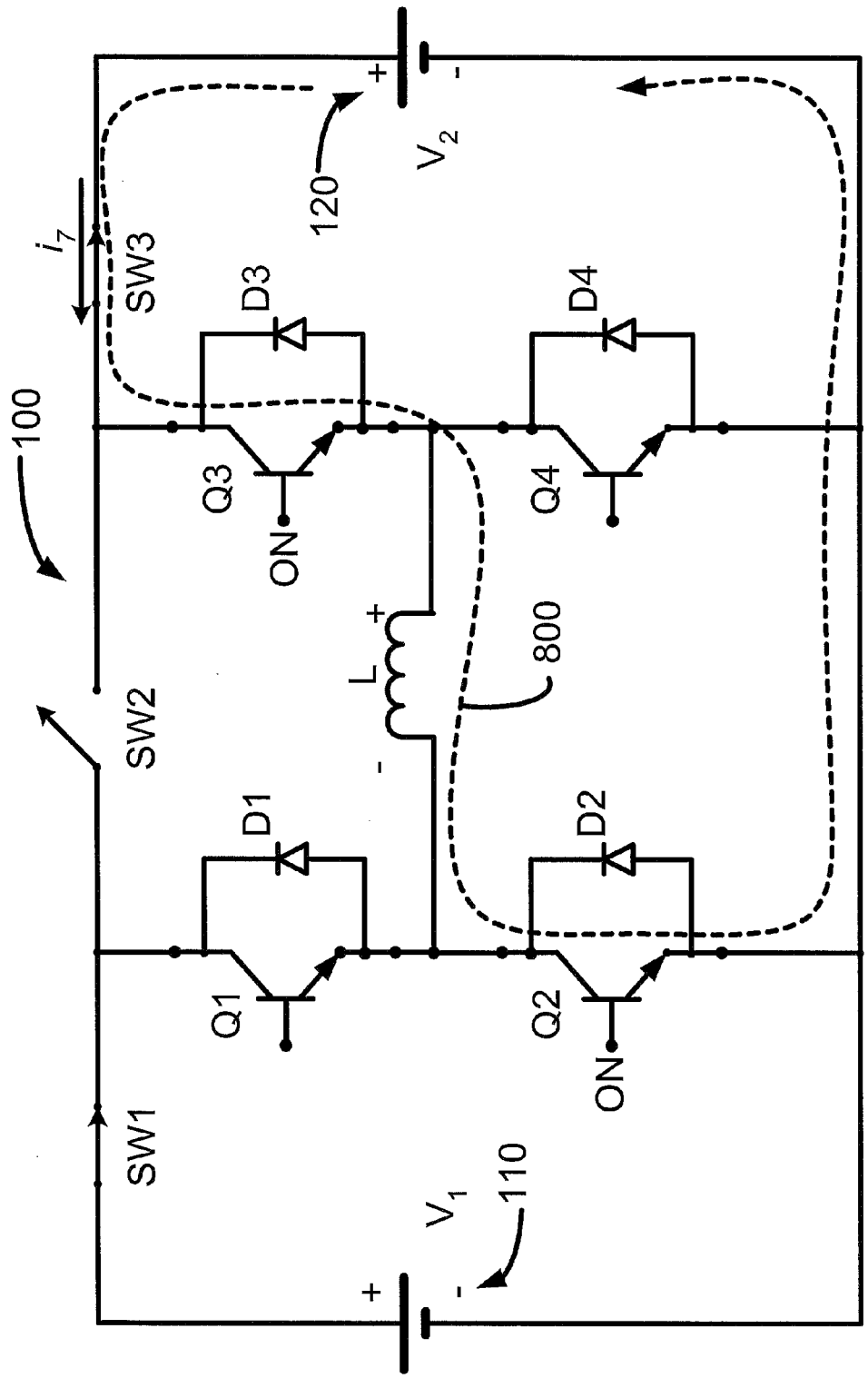
FIG. 8 is a schematic diagram of the electronic circuit in FIG. 1 configured to operate in a third cycle of a power exchange-heating mode.
Figure 9:
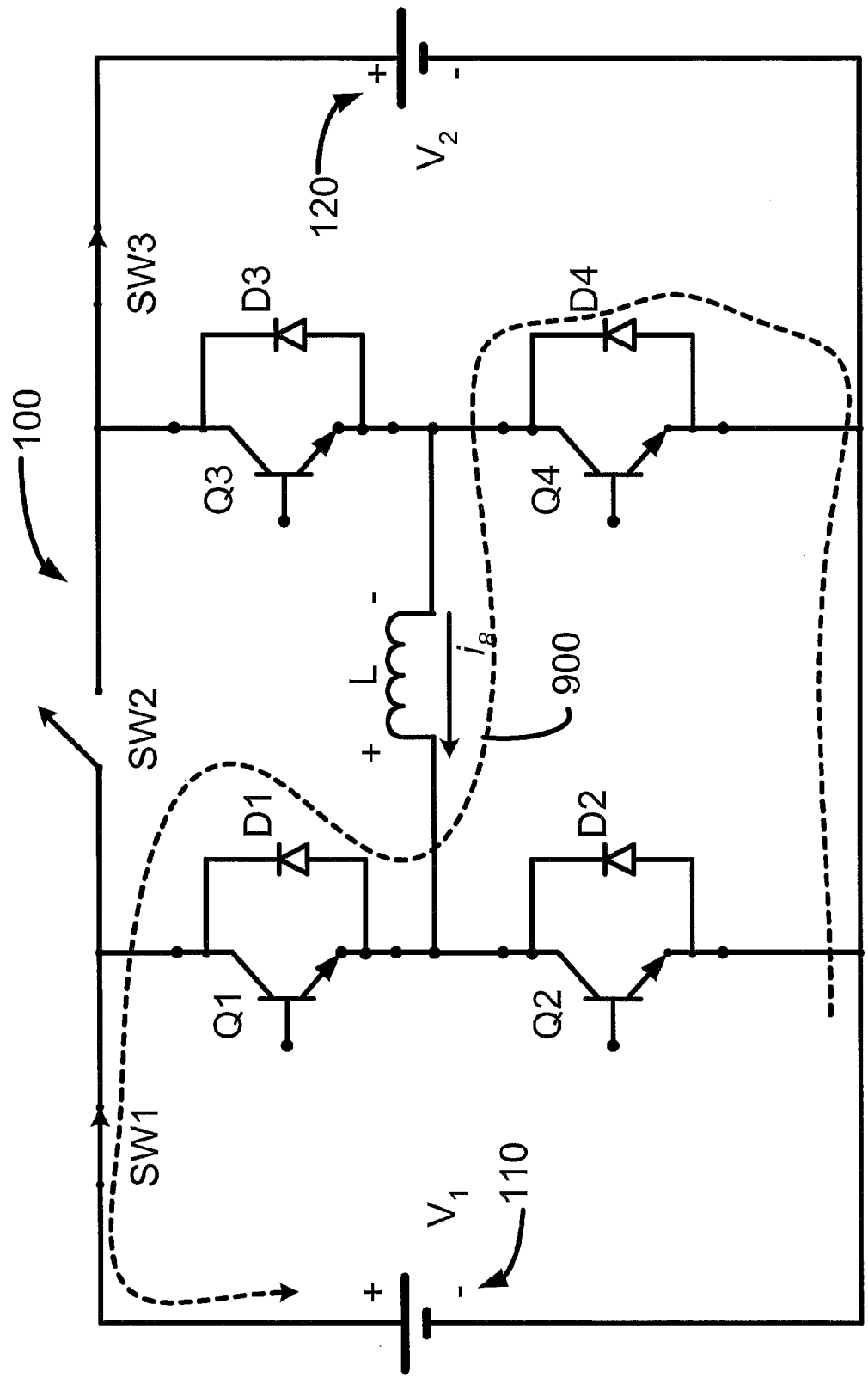
FIG. 9 is a schematic diagram of the electronic circuit in FIG. 1 configured to operate in a fourth cycle of a power exchange-heating mode.

The power exchange-heating mode performed by the electronic circuit 100 operates by performing a power exchange with the primary battery 110 and secondary battery 120. The power exchange-heating mode is started when the mode control switches SW1 and SW3 are set to the closed position and the mode control switch SW2 is set to the open position. The power exchange-heating mode is performed in four cycles illustrated in FIGS. 6, 7, 8 and 9. FIG. 6 shows the electronic circuit 100 configured to operate in a first cycle of the power exchange-heating mode. FIG. 7 shows the electronic circuit 100 configured to operate in a second cycle of the power exchange-heating mode. FIG. 8 shows the electronic circuit 100 configured to operate in a third cycle of the power exchange-heating mode. FIG. 9 shows the electronic circuit 100 configured to operate in a fourth cycle of the power exchange-heating mode. The sequencing of all four cycles of the power exchange-heating mode contributes to the heating of the primary and secondary batteries. The amount of heat generated depends on the batteries' amp-hour rating, the amount of power exchanged via the inductor L, the duration of operation in the power exchange-heating mode, the current state of the batteries and ambient temperature.

Referring to FIG. 6, the first cycle is performed by switching the transistors Q1 and Q4 to the ON state. The transistors Q1 and Q4 provide a first cycle current path 600 for the current $i_5$ generated by the primary battery 110. The first cycle current path 600 allows the current $i_5$ to flow through the transistor Q1, through the inductor L and through the transistor Q4 to return to the primary battery 110. During the first cycle, the inductor L is provided with charge from the primary battery 110. The first cycle is maintained according to the frequency and duty cycle of the signal at transistors Q1 and Q4, which are determined to be sufficiently long to allow the inductor L to become sufficiently charged.

The second cycle is entered by turning off the transistors Q1 and Q4 as shown in FIG. 7. Turning off transistors Q1 and Q4 allows the inductor L to become a current source that generates a current $i_6$ flowing through a second cycle current path 700. The current $i_6$ flows through diode D3, through mode control switch SW3, to the secondary battery 120. The return path to the inductor L flows through diode D2 back to the inductor L. When the inductor L has become suitably discharged, the transistors Q2 and Q3 may be switched to the 'ON' state to permit re-charging of the inductor L in the third cycle of the power exchange-heating mode.

The third cycle is entered by turning transistors Q2 and Q3 to the 'ON' state after the second cycle as shown in FIG. 8. In the power exchange-heating mode, the secondary battery 120 generates a current $i_7$, which flows through a third cycle current path 800. The third cycle current path 800 allows the current $i_7$ to flow through the transistor Q3 (which is ON), through the inductor L, and to return to the secondary battery 120 through transistor Q2. During the third cycle, the inductor L is provided with charge from the secondary battery 120. The third cycle is maintained according to the frequency and duty cycle of the signal at transistors Q2 and Q3, which are determined to be sufficiently long to allow the inductor L to become sufficiently charged.

The fourth cycle is entered by turning off the transistors Q2 and Q3 as shown in FIG. 9. Turning off transistors Q2 and Q3 allows the inductor L to become a current source that generates a current $i_8$ flowing through a fourth cycle current path 900. The current $i_8$ flows through diode D1, through mode control switch SW1, to the primary battery 110. The return path to the inductor L flows through diode D4 back to the inductor L. When the inductor L has become suitably discharged, the transistors Q2 and Q3 may be switched back to the 'ON' state to permit re-charging of the inductor L in the first cycle.

The power exchange-heating mode continues by cycling through the four cycles shown in FIGS. 6-9. The switching between the four cycles may be controlled by a processor (not shown) via control signals CTL1, CTL2, CTL3 and CTL 4 (in FIG. 1) until the heating of the primary battery 110 and the secondary battery 120 is no longer needed or desired, which may be indicated by the settings of the mode control switches SW1, SW2, SW3.

V. Direct Power Transfer Mode

Figure 10:
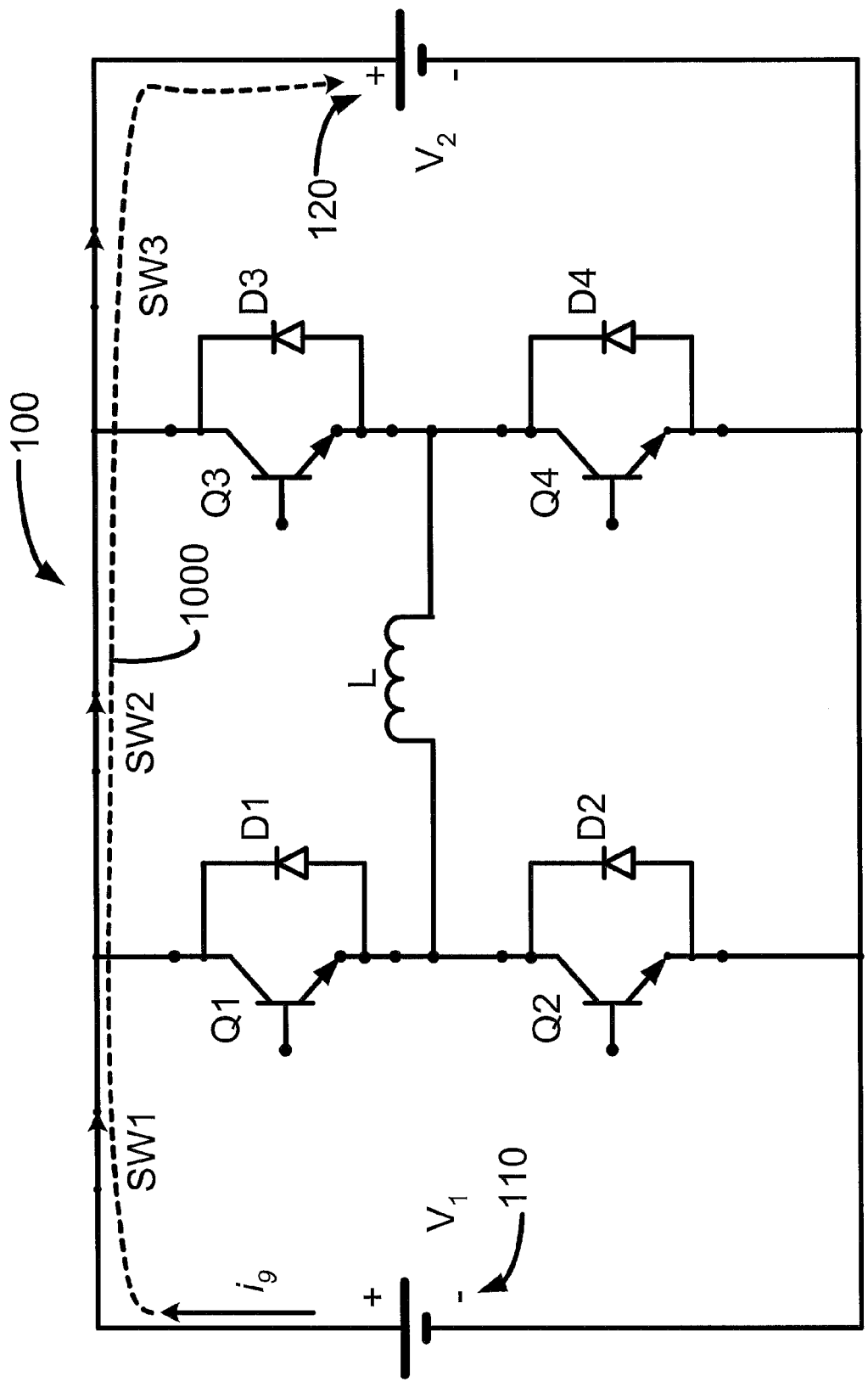
FIG. 10 is a schematic diagram of the electronic circuit in FIG. 1 configured to operate in a direct power transfer mode.

FIG. 10 is a schematic diagram of the electronic circuit 100 configured to operate in a direct power transfer mode. The mode control switches SW1, SW2, SW3 are all set to the closed position to provide a current path 1000 for the current $i_9$. The direct power transfer mode shown in FIG. 10 is a mode that allows the primary battery 110 to directly charge the secondary battery 120, the secondary battery 120 to directly charge the primary battery 110, or increase the supply current available to the primary system or sub-system.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An electronic circuit coupled between two batteries, the electronic circuit comprising:
    a plurality of mode control switches configured to set the electronic circuit to operate in one of a plurality of charging and heating modes;

a plurality of switch and diode pairs, each switch and diode pair including a diode connected across an output of an electronic switch, the electronic switch having a trigger connected to a control signal;

an inductor connected to the plurality of switch and diode pairs;

the plurality of mode control switches includes three mode control switches, wherein one mode control switch is connected to a terminal of one battery, another mode control switch is connected to a terminal of the other battery, and the third mode control switch is connected to each switch connected to each of the batteries;

the plurality of switch and diode pairs includes a first stacked switch and diode pair having a first node between two switch and diode pairs in the first stack, a second stacked switch and diode pairs having a second node between the switch and diode pairs in the second stack;

the inductor is coupled to the first and second nodes;

a top switch and diode pair of the first stacked switch and diode pairs is coupled to a third node between the first and second mode control switches;

a top switch and diode pair of the second stacked switch and diode pairs is coupled to a fourth node between the second and third mode control switches;

a bottom switch and diode pair of the two stacked switch and diode pairs are coupled to the other terminal of the two batteries; and the electronic circuit configured to operate in the plurality of charging and heating modes according to the states of the mode control switches and the control signals applied to the switch and diode pairs, where the switch and diode pairs are triggered on and off to either charge the inductor or operate the inductor as a current source for charging and heating the batteries in accordance with the charging and heating modes.

2. An electronic circuit coupled between two batteries, the electronic circuit comprising:

a plurality of mode control switches configured to set the electronic circuit to operate in one of a plurality of charging and heating modes;

a plurality of switch and diode pairs, each switch and diode pair including a diode connected across an output of an electronic switch, the electronic switch having a trigger connected to a control signal; and an inductor connected to the plurality of switch and diode pairs;

the electronic circuit configured to operate in the plurality of charging and heating modes according to the states of the mode control switches and the control signals applied to the switch and diode pairs, where the switch and diode pairs are triggered on and off to either charge the inductor or operate the inductor as a current source for charging and heating the batteries in accordance with the charging and heating modes; and where the plurality of mode control switches includes at least three mode control switches, wherein one mode control switch is connected to one battery, another mode control switch is connected to the other battery, and a third mode control switch is connected to each switch connected to each of the batteries and where the mode control switches and the switch and diode pairs are switched to operate in any one of the following four modes:

a charging mode configured to transfer charge from one battery to the other battery via the inductor;

a first heating mode configured to provide self-heating of one of the batteries;

a second heating mode configured to provide heating of both batteries via the inductor; and a direct power transfer mode configured to provide direct charging of one of the batteries via the other battery.

3. The electronic circuit of claim 2, where the switch and diode pairs include electronic switches selected from a group consisting of transistors, bipolar junction transistors, field effect transistors, integrated circuits, power transistors.

4. The electronic circuit of claim 2 where the mode control switches include switches selected from a group consisting of transistors, bipolar junction transistors, field effect transistors, silicon-controlled rectifiers, integrated circuits, power transistors, mechanical switches, throw switches, push-buttons, dial switches, rotary switches, electromechanical switches, relays, contactors, solenoids.

5. The electronic circuit of claim 2 configured to operate in a vehicle where one battery is the main vehicle battery, and the other belongs to a vehicle sub-system.

6. The electronic circuit of claim 2 configured to operate in a vehicle where both batteries operate in different vehicle sub-systems.

7. A battery-operated sub-system configured to operate in a battery-operated system, the battery-operated system powered by a primary battery and the battery-operated sub-system powered by a secondary battery, the battery-operated sub-system comprising:

a controller configured to generate a plurality of control signals; and an electronic circuit connected to the primary battery and to the secondary battery, the electronic circuit having:

a plurality of mode control switches configured to set the electronic circuit to operate in one of a plurality of charging and heating modes;

a plurality of switch and diode pairs, each switch and diode pair including a diode connected across an output of an electronic switch, the electronic switch in the plurality of switch and diode pairs having a trigger connected to one of the plurality of control signals; and an inductor connected to the plurality of switch and diode pairs;

the plurality of mode control switches includes three mode control switches, wherein one mode control switch is connected to a terminal of one battery, another mode control switch is connected to a terminal of the other battery, and the third mode control switch is connected to each switch connected to each of the batteries;

the plurality of switch and diode pairs includes a first stacked switch and diode pair having a first node between two switch and diode pairs in the first stack, a second stacked switch and diode pairs having a second node between the switch and diode pairs in the second stack;

the inductor is coupled to the first and second nodes;

a top switch and diode pair of the first stacked switch and diode pairs is coupled to a third node between the first and second switches;

a top switch and diode pair of the second stacked switch and diode pairs is coupled to a fourth node between the second and third switches;

a bottom switch and diode pairs of the two stacked switch and diode pairs are coupled to the other terminal of the two batteries; and the electronic circuit configured to operate in the plurality of charging and heating modes according to the states of the mode control switches and the control signals applied to the switch and diode pairs, where the switch and diode pairs are triggered on and off to either charge the inductor or operate the inductor as a current source for charging and heating the batteries in accordance with the charging and heating modes.

8. A battery-operated sub-system configured to operate in a battery-operated system, the battery operated system powered by a primary battery and the battery-operated sub-system powered by a secondary battery, the battery-operated sub-system comprising:
   a controller configured to generate a plurality of control signals; and
   an electronic circuit connected to the primary battery and to the secondary battery, the electronic circuit having:
   a plurality of mode control switches configured to set the electronic circuit to operate in one of a plurality of charging and heating modes;
   a plurality of switch and diode pairs, each switch and diode pair including a diode connected across an output of an electronic switch, the electronic switch in the plurality of switch and diode pairs having a trigger connected to one of the plurality of control signals; and
   an inductor connected to the plurality of switch and diode pairs;
   the electronic circuit configured to operate in the plurality of charging and heating modes according to the states of the mode control switches and the control signals applied to the switch and diode pairs, where the switch and diode pairs are triggered on and off to either charge the inductor or operate the inductor as a current source for charging and heating the batteries in accordance with the charging and heating modes; and
   where the plurality of mode control switches includes at least three mode control switches, where one mode control switch is connected to the primary battery, another mode control switch is connected to the secondary battery, and a third mode control switch is connected to each switch connected to each of the batteries and where the mode control switches and the switch and diode pairs are switched to operate in any one of the following four modes:
   a charging mode configured to charge the secondary battery via the inductor;
   a first heating mode configured to provide self-heating of the secondary battery;
   a second heating mode configured to provide heating of both the primary and secondary battery via the inductor; and
   a direct power transfer mode configured to provide direct charging of the secondary battery via the primary battery.

9. The battery-operated sub-system of claim 8 where the switch and diode pairs include electronic switches selected from a group consisting of transistors, bipolar junction transistors, field effect transistors, integrated circuits, power transistors.

10. The battery-operated sub-system of claim 8 where the mode control switches include switches selected from a group consisting of transistors, bipolar junction transistors, field effect transistors, silicon-controlled rectifiers, integrated circuits, power transistors, mechanical switches, throw switches, push-buttons, dial switches, rotary switches, electromechanical switches, relays, contactors, solenoids.

11. The battery-operated sub-system of claim 8 where the battery-operated system is a vehicle and the primary battery is a vehicle battery.

12. The battery-operated sub-system of claim 8 configured to control a door on a military vehicle.

13. A method for charging and heating at least one battery in a system having two batteries, the method comprising:
   switching mode control switches of an electronic circuit to one of a plurality of charging and heating modes;
   configuring a plurality of switch and diode pairs to alternately charge and discharge an inductor to provide charge to one or both of the batteries to either charge or heat the batteries in accordance with the selected charging and heating mode;
   coupling a plurality of control signals to the plurality of switch and diode pairs to cycle the charging and discharging of the inductor in accordance with the selected charging, and heating mode; and
   where the step of coupling the plurality of control signals cycles the charging and discharging by:
   setting the mode control switches and the plurality of switch and diode pairs of the electronic circuit to a first cycle by:
      connecting a first one of the batteries to the inductor; and
      disconnecting a second one of the batteries from the inductor;
   charging the inductor with the first battery in the first cycle;
   setting the mode control switches and the plurality of switch and diode pairs of the electronic circuit to a second cycle by:
      disconnecting the first battery from the inductor; and
      connecting the second battery to the inductor to generate a current flow from the inductor to the second battery;
   charging the second battery with the inductor in the second cycle.

14. A method for charging and heating at least one battery in a system having two batteries, the method comprising:
   switching mode control switches of an electronic circuit to one of a plurality of charging, and heating modes;
   configuring a plurality of switch and diode pairs to alternately charge and discharge an inductor to provide charge to one or both of the batteries to either charge or heat the batteries in accordance with the selected charging and heating mode;
   coupling a plurality of control signals to the plurality of switch and diode pairs to cycle the charging and discharging of the inductor in accordance with the selected charging and heating mode; and
   where the step of coupling the plurality of control signals cycles the charging and discharging by:
   setting the mode control switches and the plurality of switch and diode pairs of the electronic circuit to a first cycle by:
      disconnecting a first one of the batteries from the inductor;
      connecting a second one of the batteries to the inductor to generate a current flow through the inductor;
   charging the inductor with the second battery and heating the second battery in the first cycle;
   setting the mode control switches and the plurality of switch and diode pairs of the electronic circuit to a second cycle by connecting the inductor to the second battery to generate a current flow from the inductor to the second battery to heat the second battery with the charge in the inductor.

15. A method for charging and heating at least one battery in a system having two batteries, the method comprising:
   switching an electronic circuit to one of a plurality of charging and heating modes;
   configuring a plurality of switch and diode pairs to alternately charge and discharge an inductor to provide charge to one or both of the batteries to either charge or heat the batteries in accordance with the selected charging and heating mode; and
   coupling a plurality of control signals to the plurality of switch and diode pairs to cycle the charging and discharging of the inductor in accordance with the selected charging and heating mode by:
   setting the electronic circuit to a first cycle by:
      connecting a first one of the batteries to the inductor; and
      disconnecting a second one of the batteries from the inductor;
   charging the inductor with the first battery and heating the first battery in the first cycle;
   setting the electronic circuit to a second cycle by:
      disconnecting the first battery from the inductor; and
      connecting the second battery to the inductor to generate a current flow from the inductor to the second battery to heat the second battery with the charge in the inductor;
   setting the electronic circuit to a third cycle by connecting the second battery to the inductor to generate a current flow from the second battery to the inductor to charge the inductor and to heat the second battery using the second battery;
   setting the electronic circuit to a fourth cycle by:
      connecting the first battery to the inductor to generate a current flow from the inductor to the first battery to heat the first battery; and
      disconnecting the second battery from the inductor.

16. A method for charging and heating at least one battery in a system having two batteries, the method comprising:
   switching mode control switches of an electronic circuit to one of a plurality of charging and heating modes;
   configuring a plurality of switch and diode pairs to alternately charge and discharge an inductor to provide charge to one or both of the batteries to either charge or heat the batteries in accordance with the selected charging and heating mode;
   coupling a plurality of control signals to the plurality of switch and diode pairs to cycle the charging and discharging of the inductor in accordance with the selected charging and heating mode; and
   setting the mode control switches and the plurality of switch and diode pairs of the electronic circuit to directly transfer power from one battery to the other by:
      closing the mode control switches to connect the batteries to one another; and
      switching the switch and diode pairs to an OFF position to allow charge to flow from one battery to the other via the mode control switches thereby increasing the supply current in the battery receiving the charge and heating both batteries.

* * * * *

UNITED STATES PATENT AND TRADEMARK OFFICE
CERTIFICATE OF CORRECTION

PATENT NO. : 8,452,490 B2
APPLICATION NO. : 12/637471
DATED : May 28, 2013
INVENTOR(S) : Konstantin Lakirovich et al.

It is certified that error appears in the above-identified patent and that said Letters Patent is hereby corrected as shown below:

In the Claims:

Col. 11, Claim 8, line 15, change "circuit haying" to --circuit having--;

Col. 12, Claim 13, line 15, change "and discharging," to --and discharging--;

Col. 12, Claim 14, line 39, change "of charging," to --of charging--.

Signed and Sealed this
Ninth Day of July, 2013

Teresa Stanek Rea
*Acting Director of the United States Patent and Trademark Office*